(12) United States Patent
Cho et al.

(10) Patent No.: US 12,221,702 B2
(45) Date of Patent: Feb. 11, 2025

(54) SURFACE TREATMENT SOLUTION COMPOSITION CONTAINING TRIVALENT CHROMIUM AND INORGANIC COMPOUND, AND METHOD FOR MANUFACTURING HOT DIP GALVANIZED STEEL SHEET SURFACE-TREATED USING SAME

(71) Applicant: POSCO, Pohang-si (KR)

(72) Inventors: Soo-Hyoun Cho, Pohang-si (KR); Kang-Min Lee, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 264 days.

(21) Appl. No.: 17/288,232

(22) PCT Filed: Oct. 17, 2019

(86) PCT No.: PCT/KR2019/013646
§ 371 (c)(1),
(2) Date: Apr. 23, 2021

(87) PCT Pub. No.: WO2020/085716
PCT Pub. Date: Apr. 30, 2020

(65) Prior Publication Data
US 2021/0388504 A1    Dec. 16, 2021

(30) Foreign Application Priority Data
Oct. 24, 2018 (KR) .................. 10-2018-0127781

(51) Int. Cl.
*C23C 22/08* (2006.01)
*B05D 1/18* (2006.01)
(Continued)

(52) U.S. Cl.
CPC ............ *C23C 22/08* (2013.01); *B05D 1/18* (2013.01); *B05D 1/185* (2013.01); *B05D 3/007* (2013.01); *B05D 3/02* (2013.01); *B05D 3/0209* (2013.01); *B05D 3/0254* (2013.01); *B05D 3/0272* (2013.01); *B05D 3/0281* (2013.01); *B32B 15/012* (2013.01); *B32B 15/013* (2013.01); *B32B 15/04* (2013.01); *B32B 15/08* (2013.01); *B32B 15/18* (2013.01); *C09D 5/084* (2013.01); *C09D 5/086* (2013.01); *C09D 7/61* (2018.01); *C09D 183/04* (2013.01); *C23C 2/06* (2013.01); *C23C 2/26* (2013.01); *C23C 2/40* (2013.01); *C23C 22/05* (2013.01); *C23C 22/26* (2013.01); *C23C 22/28* (2013.01); *C23C 22/30* (2013.01); *C23C 22/42* (2013.01); *C23C 22/53* (2013.01);
(Continued)

(58) Field of Classification Search
CPC ..... C23C 28/00; C23C 28/3225; C23C 28/34; C23C 28/345; C23C 2/06; C23C 2/26; C23C 2/40; C23C 22/08; C23C 22/42; C23C 22/40; C23C 22/05; C23C 22/53; C23C 22/56; C23C 22/82; C23C 22/26; C23C 22/28; C23C 22/30; C23C 2222/10; C23C 2222/20; C09D 5/084; C09D 5/086; C09D 7/61; C09D 183/04; C08K 3/28; C08K 3/36; C08K 5/07; C08K 13/02; C08K 2003/328; C08K 2201/014; B32B 15/012; B32B 15/013; B32B 15/04; B32B 15/18; B32B 15/08; B05D 2202/10; B05D 1/18; B05D 1/185; B05D 3/007; B05D 3/02; B05D 3/0209; B05D 3/0254; B05D 3/0272; B05D 3/0281; Y10T 428/12556; Y10T 428/12569; Y10T 428/12757; Y10T 428/12799; Y10T 428/24967; Y10T 428/2495; Y10T 428/263; Y10T 428/264; Y10T 428/265

See application file for complete search history.

(56) References Cited

U.S. PATENT DOCUMENTS

| 10,738,384 B2 | 8/2020 | Shoji et al. |
| 10,822,705 B2 | 11/2020 | Cho et al. |

(Continued)

FOREIGN PATENT DOCUMENTS

| CN | 101535529 | 9/2009 |
| CN | 104451645 | 3/2015 |
| CN | 107815676 A | 3/2018 |
| EP | 3385405 | 10/2018 |

(Continued)

OTHER PUBLICATIONS

EP Extended Search Report issued Nov. 4, 2021 re: Application No. PCT/KR2019/013646, pp. 1-9.

(Continued)

*Primary Examiner* — Michael E. La Villa
(74) *Attorney, Agent, or Firm* — CANTOR COLBURN LLP

(57) ABSTRACT

Provided is a surface treatment solution composition comprising: 30 to 51 wt % of a trivalent chromium compound comprising chromium phosphate (A) and chromium nitrate (B) and having a content ratio of A/(A+B) that satisfies 0.3 to 0.6; 5 to 15 wt % of silane coupling agent; 0.2 to 3 wt % of vanadium-based anti-corrosive rust inhibitor; 3 to 12 wt % of colloidal silica; 0.5 to 5 wt % of polysiloxane copolymer; and 14 to 61.3 wt % of water, a hot dip galvanized steel sheet surface-treated using same, and a manufacturing method thereof. The hot dip galvanized steel sheet treated with the surface treatment solution composition containing trivalent chromium has an excellent corrosion resistance, blackening resistance, pipe-forming oil reactivity, and alkali resistance.

15 Claims, No Drawings

(51) Int. Cl.
- B05D 3/00 (2006.01)
- B05D 3/02 (2006.01)
- B32B 15/01 (2006.01)
- B32B 15/04 (2006.01)
- B32B 15/08 (2006.01)
- B32B 15/18 (2006.01)
- C09D 5/08 (2006.01)
- C09D 7/61 (2018.01)
- C09D 183/04 (2006.01)
- C23C 2/06 (2006.01)
- C23C 2/26 (2006.01)
- C23C 2/40 (2006.01)
- C23C 22/05 (2006.01)
- C23C 22/26 (2006.01)
- C23C 22/28 (2006.01)
- C23C 22/30 (2006.01)
- C23C 22/42 (2006.01)
- C23C 22/53 (2006.01)
- C23C 22/56 (2006.01)
- C23C 22/82 (2006.01)
- C23C 28/00 (2006.01)
- C08K 3/28 (2006.01)
- C08K 3/32 (2006.01)
- C08K 3/36 (2006.01)
- C08K 5/07 (2006.01)
- C08K 13/02 (2006.01)
- C23C 22/40 (2006.01)

(52) U.S. Cl.
CPC .............. *C23C 22/56* (2013.01); *C23C 22/82* (2013.01); *C23C 28/00* (2013.01); *C23C 28/3225* (2013.01); *C23C 28/34* (2013.01); *C23C 28/345* (2013.01); *B05D 2202/10* (2013.01); *C08K 3/28* (2013.01); *C08K 2003/328* (2013.01); *C08K 3/36* (2013.01); *C08K 5/07* (2013.01); *C08K 13/02* (2013.01); *C08K 2201/014* (2013.01); *C23C 22/40* (2013.01); *C23C 2222/10* (2013.01); *C23C 2222/20* (2013.01); *Y10T 428/12556* (2015.01); *Y10T 428/12569* (2015.01); *Y10T 428/12757* (2015.01); *Y10T 428/12799* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(56) References Cited

U.S. PATENT DOCUMENTS

| | | |
|---|---|---|
| 2007/0023104 A1 | 2/2007 | Yamamoto et al. |
| 2010/0035055 A1 | 2/2010 | Okai et al. |
| 2018/0347051 A1* | 12/2018 | Li .......................... C23C 22/40 |
| 2019/0264333 A1 | 8/2019 | Cho et al. |

FOREIGN PATENT DOCUMENTS

| | | |
|---|---|---|
| JP | H06173027 | 6/1994 |
| JP | 2002069660 | 3/2002 |
| JP | 2008127470 | 6/2008 |
| JP | 2009149926 | 7/2009 |
| JP | 6075520 | 2/2017 |
| KR | 20040046347 | 6/2004 |
| KR | 20050052215 | 6/2005 |
| KR | 100535769 | 12/2005 |
| KR | 20060123628 | 12/2006 |
| KR | 20100049944 | 5/2010 |
| KR | 20100106031 | 10/2010 |
| KR | 20120052418 | 5/2012 |
| KR | 101786358 | 10/2017 |
| KR | 101786392 | 10/2017 |
| KR | 20180046638 | 5/2018 |

OTHER PUBLICATIONS

Chinese Office Action—Chinese Application No. 201980070901.9 issued on Aug. 19, 2022.
International Search Report—PCT/KR2019/013646 dated Jan. 22, 2020.

* cited by examiner

SURFACE TREATMENT SOLUTION COMPOSITION CONTAINING TRIVALENT CHROMIUM AND INORGANIC COMPOUND, AND METHOD FOR MANUFACTURING HOT DIP GALVANIZED STEEL SHEET SURFACE-TREATED USING SAME

TECHNICAL FIELD

The present disclosure relates to a surface treatment solution composition containing highly corrosion resistant trivalent chromium and an inorganic compound, and a method for manufacturing a hot dip galvanized steel sheet surface-treated using the same.

BACKGROUND ART

A hot dip plated material on which a zinc (Zn) plating layer is formed has been widely used as a material for a construction material because it has excellent corrosion resistance due to a protection effect of base iron in a sacrificial manner. However, since the hot dip plated material has an exposed surface formed of Zn, white rust, which is a zinc oxide, is easily generated on a surface of the hot dip plated material when the hot dip plated material is exposed to a general corrosive environment, particularly a humid atmosphere, resulting in poor quality characteristics of the material. In addition, when a zinc plated material is exposed to a high temperature and high humidity environment, a blackening phenomenon in which a surface color changes to black easily occurs.

In order to solve this problem, in the related art, corrosion resistance and blackening resistance have been secured by performing hexavalent chromium or chromate treatment on a plated steel sheet. However, as such hexavalent chromium is designated as a harmful environmental substance, regulations on the use of hexavalent chromium are currently being strengthened. Moreover, when hexavalent chromium is used as a surface treatment agent for a hot dip galvanized steel sheet, there has been a problem that a surface color of the hot dip galvanized steel sheet changes to black or black spots occur.

Therefore, recently, in order to solve an environmental hazard problem of hexavalent chromium, a method for securing corrosion resistance and blackening resistance of a galvanized steel sheet by coating a surface treatment solution composition containing trivalent chromium on the galvanized steel sheet has been applied. For example, in Korean Patent Laid-Open Publication Nos. 2006-0123628, 2005-0052215, and 2009-0024450, corrosion resistance and blackening of a steel sheet are secured in a manner of immersing the steel sheet in a composition containing trivalent chromium to perform chemical conversion treatment on the steel sheet. However, an immersion time is too long for such a composition to be applied to a continuous process of a steel maker, and a chemical conversion treatment method has a problem such as deterioration of anti-fingerprint, or the like.

In addition, in Korean Patent Laid-Open Publication No. 2004-0046347 and Japanese Patent Laid-Open Publication No. 2002-069660, a composition containing trivalent chromium is coated on a plated steel sheet in a spray or roll coater manner, so that it may be applied to a continuous process of a steel maker and anti-fingerprint may be secured. However, such a composition comprises a porous silica component, and thus, is not appropriate for Mg and Al alloys that have severe discoloration in a moist atmosphere. The porous silica has a strong moisture absorption property, and thus causes rapid discoloration in Mg, Al, and Zn alloy steel sheets.

DISCLOSURE

Technical Problem

An aspect of the present disclosure is to provide a surface treatment solution composition that does not contain hexavalent chromium, which is a harmful environmental substance, and contains trivalent chromium that is harmless to the human body and an inorganic compound as main components.

Another aspect of the present disclosure is to provide a hot dip galvanized steel sheet surface-treated with trivalent chromium and an inorganic compound, having excellent corrosion resistance, blackening resistance, pipe-forming oil reactivity, and alkali resistance by applying the surface treatment solution composition according to the present disclosure to a surface of the hot dip galvanized steel sheet.

Another aspect of the present disclosure is to provide a method for manufacturing a hot dip galvanized steel sheet surface-treated using the surface treatment solution composition according to the present disclosure.

Technical Solution

According to an aspect of the present disclosure, a surface treatment solution composition comprises: 30 to 51 wt % of a trivalent chromium compound comprising chromium phosphate (A) and chromium nitrate (B) of which a content ratio (A/(A+B)) is 0.3 to 0.6; 5 to 15 wt % of a silane coupling agent; 0.2 to 3 wt % of a vanadium-based anti-corrosive rust inhibitor; 3 to 12 wt % of colloidal silica; 0.5 to 5 wt % of a polysiloxane copolymer; and 14 to 61.3 wt % of water.

According to another aspect of the present disclosure, a surface-treated hot dip galvanized steel sheet comprises: a steel sheet; a hot dip galvanized layer formed on at least one surface of the steel sheet; and a trivalent chromate coating layer formed on the hot dip galvanized layer, wherein the trivalent chromate coating layer comprises: 37.7 to 58.1 wt % of a trivalent chromium compound comprising chromium phosphate (A) and chromium nitrate (B) of which a content ratio (A/(A+B)) is 0.89 to 0.95; 34.6 to 40.7 wt % of a silane coupling agent; 1.4 to 8.2 wt % of a vanadium-based anti-corrosive rust inhibitor; 4.2 to 6.6 wt % of colloidal silica; and 1.7 to 6.8 wt % of a polysiloxane copolymer.

According to another aspect of the present disclosure, a method for manufacturing a surface-treated hot dip galvanized steel sheet comprises: coating the surface treatment solution composition described above on a hot dip galvanized steel sheet on which a hot dip galvanized layer is formed; and drying the coated surface treatment solution composition to form a trivalent chromate coating layer.

Advantageous Effects

As set forth above, the hot dip galvanized steel sheet treated with the surface treatment solution composition containing trivalent chromium and an inorganic compound according to the present disclosure has excellent corrosion resistance, blackening resistance, weldability, and alkali resistance.

BEST MODE FOR INVENTION

Hereinafter, exemplary embodiments in the present disclosure will be described with reference to the accompanying drawings. However, exemplary embodiments in the present disclosure may be modified in several other forms, and the scope of the present disclosure is not limited to exemplary embodiments to be described below.

The present disclosure relates to a surface treatment solution composition containing trivalent chromium, a hot dip galvanized steel sheet surface-treated using the surface treatment solution composition, and a method for manufacturing the hot dip galvanized steel sheet.

A surface treatment solution composition according to an exemplary embodiment in the present disclosure comprises: 30 to 51 wt % of a trivalent chromium compound; 5 to 15 wt % of a silane coupling agent; 0.2 to 3 wt % of a vanadium-based anti-corrosive rust inhibitor; 3 to 12 wt % of colloidal silica; 0.5 to 5 wt % of a polysiloxane copolymer; and 14 to 61.3 wt % of water, based on a total weight of the surface treatment solution composition, wherein the trivalent chromium compound comprises chromium phosphate (A) and chromium nitrate (B) of which a content ratio (A/(A+B)) is 0.3 to 0.6.

A hot dip galvanized steel sheet surface-treated with the surface treatment solution composition containing trivalent chromium according to the present disclosure has excellent corrosion resistance, blackening resistance, weldability, and alkali resistance. In addition, the surface treatment solution composition does not contain hexavalent chromium, which is a harmful environmental substance, and contains trivalent chromium that is harmless to the human body as a main component to prevent problems such as damage to the human body and environmental pollution.

The trivalent chromium compound, which is a component comprised as a main component in the surface treatment solution composition according to the present disclosure, has a self-healing effect and self-lubrication similar to those of hexavalent chromium, and serves to secure corrosion resistance and blackening resistance. The trivalent chromium compound comprised in the surface treatment solution composition according to the present disclosure comprises chromium phosphate (A) and chromium nitrate (B).

As a ratio of the chromium phosphate increases, the corrosion resistance is improved, while blackening resistance may become inferior. On the other hand, as a ratio of the chromium nitrate increases, blackening resistance is improved, while the corrosion resistance may become inferior. Specifically, when a coating is formed with the chromium phosphate, a phosphate component is not volatilized, and a chromium phosphate coating is thus formed on a surface of the coating, such that the corrosion resistance is improved, but blackening resistance may be deteriorated due to a moisture absorption property of the chromium phosphate. On the other hand, when a coating is formed with the chromium nitrate, most of a nitrate component is volatilized and does not affect blackening resistance, but as a content of chromium nitrate increases, it is relatively difficult to form a chromium phosphate coating on a surface of the coating, such that the corrosion resistance may be deteriorated.

Therefore, according to an exemplary embodiment in the present disclosure, contents of respective components are controlled so that the content ratio (A/(A+B)) of the chromium phosphate (A) and the chromium nitrate (B) is 0.3 to 0.6. When the content ratio is less than 0.3, the corrosion resistance after processing may be deteriorated, and when the content ratio exceeds 0.6, blackening resistance may be deteriorated.

A total content of the trivalent chromium compound comprising the chromium phosphate (A) and the chromium nitrate (B) is 30 to 51 wt %, and preferably, 35 to 45 wt %.

When the content of the trivalent chromium compound is less than 30 wt %, a solid insoluble coating layer becomes thin, such that moisture permeation may not be effectively blocked on a surface of the galvanized steel sheet requiring corrosion resistance, resulting in blackening and deterioration in corrosion resistance. On the other hand, when the content of the trivalent chromium compound exceeds 51 wt %, contents of a vanadium-based anti-corrosive rust inhibitor added in order to improve corrosion resistance, colloidal silica, and a silane coupling agent serving as a binder are relatively reduced, such that it is difficult to secure sufficient corrosion resistance and blackening resistance.

The silane coupling agent is to promote drying and secure highly corrosion resistant through a role of crosslinking an inorganic component and an organic component. A type of the silane coupling agent is not particularly limited, and is preferably one or more selected from the group consisting of, for example, 2-(3,4 epoxycyclohexyl)-ethyltrimethoxysilane, 3-glycyloxypropyl trimethoxysilane, 3-glycyloxypropyl methyldiethoxysilane, 3-glycyloxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureido propyltrimethoxysilane, and tetraethylorthosilicate.

A content of the silane coupling agent is 5 to 15 wt %, and preferably 7 to 12 wt %. When the content of the silane coupling agent is less than 5 wt %, alkali resistance and fuel resistance become inferior, and when the content of the silane coupling agent exceeds 15 wt %, dryness of a coating increases, such that an excessively hard coating is formed, resulting in inferior processed portion corrosion resistance.

The vanadium-based anti-corrosive rust inhibitor is comprised in order to form a passive coating on a surface of the hot dip galvanized steel sheet surface-treated with the surface treatment solution composition according to the present disclosure to improve corrosion resistance of the hot dip galvanized steel sheet. Therefore, when damage to the coating of the hot dip galvanized steel sheet occurs, tetravalent vanadium of an adjacent coating is eluted and reduced to trivalent vanadium to form a passive coating on an exposed plating surface, thereby suppressing corrosion. In addition, in a corrosive environment, vanadium is preferentially eluted to suppress an increase in pH due to dissolution of a plating component, and the corrosion resistance of the hot dip galvanized steel sheet may thus be improved. In addition, the vanadium-based anti-corrosive rust inhibitor may interfere with a blackening phenomenon of a surface of a plating layer due to formation of odd electron ions of zinc to improve blackening resistance of the plating layer.

The vanadium-based anti-corrosive rust inhibitor may be preferably one or more selected from the group consisting of vanadium pentoxide ($V_2O_5$), metavanadic acid ($HVO_3$), ammonium metavanadate, sodium metavanadate, vanadium oxytrichloride ($VOCl_3$), vanadium trioxide ($V_2O_3$), vanadium dioxide ($VO_2$), vanadium oxysulfate ($VOSO_4$), vanadium oxyoxalate [$VO(COO)_2$], vanadium oxyacetylacetonate [$VO(OC(CH_3)=CHCOCH_3))_2$], vanadium acetylacetonate [$V(OC(CH_3))=CHCOCH_3))_3$], vanadium trichloride ($VCl_3$), vanadium sulfate ($VSO_4.8H_2O$), vanadium dichloride ($VCl_2$), and vanadium oxide (VO).

A content of the vanadium-based anti-corrosive rust inhibitor is 0.2 to 3 wt %, and preferably 0.5 to 2 wt %. When the content of the vanadium-based anti-corrosive rust inhibitor is less than 0.2 wt %, it is difficult to secure the corrosion resistance, and when the content of the vanadium-based anti-corrosive rust inhibitor exceeds 3 wt %, it is difficult to secure blackening resistance and alkali resistance.

The colloidal silica is effective in improving the corrosion resistance of the hot dip galvanized steel sheet surface-treated with the surface treatment solution composition according to the present disclosure by forming an inorganic silica bond with a trivalent chromium compound to enhance denseness of the coating and prevent penetration of a corrosion factor. The colloidal silica has a particle size of 5 to 15 nm and may be water-dispersed in an acidic aqueous solution having a pH of 3 to 5. In this case, when the particle size of the colloidal silica exceeds 15 nm, a problem that solution stability is deteriorated in a water dispersion process may occur, and a problem that processability is deteriorated due to friction with a press surface in a press process or the like for processing a product after a coating is formed on the hot dip galvanized steel sheet may be caused. In addition, when the particle size of the colloidal silica is less than 5 nm, there may be a problem in securing the corrosion resistance by blocking of the corrosion factor. Further, when the pH of the acidic aqueous solution for water-dispersing the colloidal silica is out of the range of 3 to 5, there is a problem that solution stability is also deteriorated due to precipitation of the dispersed silica particles.

The colloidal silica is stably dispersed in a state in which solid silica particles are not precipitated and aggregated in a liquid such as water or an organic solvent, and a type of the colloidal silica is not limited and may be preferably Ludox HAS (snowtex-O).

A content of the colloidal silica is 3 to 12 wt %, and preferably 5 to 10 wt %. When the content of the colloidal silica is less than 3 wt %, processed portion corrosion resistance is inferior, and when the content of the colloidal silica exceeds 12 wt %, blackening resistance is deteriorated due to an increase in moisture absorption of the coating.

The polysiloxane copolymer serves to form a dense coating on the surface of the hot dip galvanized steel sheet surface-treated with the surface treatment solution composition according to the present disclosure through organic and inorganic bonds and improve corrosion resistance of a flat plate and a processed portion by imparting flexibility to the coating. In addition, the polysiloxane copolymer prevents the penetration of the corrosion factor to improve the blackening resistance of the hot dip galvanized steel sheet, and is effective in improving processability by imparting flexible coating properties.

The polysiloxane copolymer may comprise at least one component of one or more siloxane compounds selected from the group consisting of polydimethylsiloxane, polyvinylsiloxane, polyphenylmethylsiloxane, hexamethylsiloxane, and the like; and one or more silane compounds selected from the group consisting of methyltrimethoxysilane, ethyltrimethoxysilane, hexamethyldisilane, triethylethoxysilane, vinyltrimethoxysilane, vinyltriethoxysilane, gammaglycidoxytriethylsilane, gammaglycidoxytrimethylsilane, and the like.

In addition, the polysiloxane copolymer is preferably obtained by synthesizing the siloxane compound and/or the silane compound in the presence of one or more acid catalysts selected from the group consisting of phosphoric acid and organic phosphoric acid, oxalic acid, citric acid, and formic acid, and may be a copolymer having a weight average molecular weight of 300 to 1500, and more preferably a copolymer having a weight average molecular weight of 650 to 750. When the weight average molecular weight of the polysiloxane copolymer is less than 300, the coating is not stably formed in a coating drying process, such that the corrosion resistance may be deteriorated, and when the weight average molecular weight of the polysiloxane copolymer exceeds 1500, a problem may occur in stability of the polysiloxane copolymer.

A content of the polysiloxane copolymer is 0.5 to 5 wt %, and preferably 1.0 to 4.5 wt %. When the content of the polysiloxane copolymer is less than 0.5 wt %, processed portion corrosion resistance, blackening resistance, and processability are inferior, and when the content of the polysiloxane copolymer exceeds 5 wt %, alkali resistance is deteriorated.

The water is a solvent of the surface treatment solution composition according to the present disclosure, and is used in order to dilute components of the surface treatment solution composition. For example, deionized water or distilled water may be used as the water. The solvent is comprised as a balance in addition to each component of the present disclosure, and a content of the solvent is preferably, for example, 14 to 61.3 wt %.

According to another exemplary embodiment in the present disclosure, there are provided a hot dip galvanized steel sheet surface-treated with the surface treatment solution composition containing trivalent chromium described above and a method for manufacturing the same.

Specifically, the hot dip galvanized steel sheet surface-treated with the surface treatment solution composition comprises a steel sheet, a zinc plating layer formed on at least one surface of the steel sheet, and a trivalent chromate coating layer formed on the zinc plating layer. In this case, the surface treatment solution composition according to the present disclosure described above may be used for the trivalent chromate coating layer, and comprises 37.7 to 58.1 wt % of a trivalent chromium compound, 34.6 to 40.7 wt % of a silane coupling agent, and 1.4 to 8.2 wt % of a vanadium-based anti-corrosive rust inhibitor, 4.2 to 6.6 wt % of colloidal silica, and 1.7 to 6.8 wt % of a polysiloxane copolymer, in more detail. Further, the trivalent chromium compound comprises chromium phosphate (A) and chromium nitrate (B) of which a content ratio (A/(A+B)) is 0.89 to 0.95.

The trivalent chromate coating layer is a coating layer obtained by drying the surface treatment solution composition described above, and corresponds to a component remaining after all volatile substances comprised in the trivalent chromate coating layer are volatilized. Therefore, the trivalent chromate coating layer does not comprise water, which is a solvent, and also does not comprise water comprised in the trivalent chromate compound or the silane coupling agent. Therefore, a content of a component comprised in the trivalent chromate coating layer is a content based on 100 wt % of a total solid content of the trivalent chromate coating layer.

The trivalent chromium compound comprises chromium phosphate (A) and chromium nitrate (B) of which a content ratio (A/(A+B)) is 0.89 to 0.95, and a content of the trivalent chromium compound is 37.7 to 58.1 wt %, preferably 44 to 51 wt %, based on the dried coating layer on the galvanized steel sheet. When the content of the trivalent chromium compound is less than 37.7 wt %, a solid insoluble coating layer becomes thin, such that moisture permeation may not be effectively blocked on a surface of the galvanized steel sheet requiring corrosion resistance, resulting in blackening and deterioration in corrosion resistance. On the other hand, when the content of the trivalent chromium compound exceeds 58.1 wt %, contents of a vanadium-based anti-corrosive rust inhibitor added in order to improve corrosion resistance, colloidal silica, polysiloxane, and a silane coupling agent serving as a binder are relatively reduced, such that it is difficult to secure sufficient corrosion resistance and blackening resistance.

In addition, the content ratio (A/(A+B)) of the chromium phosphate (A) and chromium nitrate (B) is 0.89 to 0.95, and when the content ratio is less than 0.89, corrosion resistance after processing may be deteriorated, and when the content ratio exceeds 0.95, blackening resistance may be deteriorated.

In the surface treatment solution composition, the content ratio (A/(A+B)) of the chromium phosphate (A) and the chromium nitrate (B) is 0.3 to 0.6. However, since the chromium phosphate and the chromium nitrate comprise a large amount of water, the water is removed in a process of forming a coating layer by coating and drying the surface treatment solution composition on a galvanized steel sheet, such that the content ratio (A/(A+B)) is 0.89 to 0.95.

A content of the silane coupling agent is 34.6 to 40.7 wt %, and preferably, 38.7 to 40.7 wt %, based on the coating layer dried on the hot dip galvanized steel sheet. When the content of the silane coupling agent is less than 34.6 wt %, alkali resistance and pipe-forming oil invasion become inferior, and when the content of the silane coupling agent exceeds 40.7 wt %, dryness of a coating increases, such that an excessively hard coating is formed, resulting in inferior processed portion corrosion resistance and inferior fuel resistance.

A content of the vanadium-based anti-corrosive rust inhibitor is 1.4 to 8.2 wt %, and preferably, 1.4 to 4.7 wt %, based on the coating layer dried on the hot dip galvanized steel sheet. When the content of the vanadium-based anti-corrosive rust inhibitor is less than 1.4 wt %, it is difficult to secure the corrosion resistance, and when the content of the vanadium-based anti-corrosive rust inhibitor exceeds 8.2 wt %, it is difficult to secure blackening resistance and alkali resistance.

A content of the colloidal silica is 4.2 to 6.6 wt %, and preferably, 5.8 to 6.6 wt %, based on the coating layer dried on the hot dip galvanized steel sheet. When the content of the colloidal silica is less than 4.2 wt %, processed portion corrosion resistance is inferior, and when the content of the colloidal silica exceeds 6.6 wt %, blackening resistance is deteriorated due to an increase in moisture absorption of the coating.

Meanwhile, a content of the polysiloxane copolymer is 1.7 to 6.8 wt %, and preferably, 3.3 to 6.8 wt %, based on the coating layer dried on the hot dip galvanized steel sheet. When the content of the polysiloxane copolymer is less than 1.7 wt %, processed portion corrosion resistance, blackening resistance, and processability are inferior, and when the content of the polysiloxane copolymer exceeds 6.8 wt %, alkali resistance is inferior.

According to an exemplary embodiment in the present disclosure, there is a provided a method for manufacturing a hot dip galvanized steel sheet including: preparing a hot dip galvanized steel sheet on which a hot dip galvanized layer is formed; coating a surface treatment solution composition according to the present disclosure on the hot dip galvanized layer; and drying the coated surface treatment solution composition to form a trivalent chromate coating layer.

The surface treatment solution composition comprises 30 to 51 wt % of a trivalent chromium compound comprising chromium phosphate (A) and chromium nitrate (B) of which a content ratio (A/(A+B)) is 0.3 to 0.6, 5 to 15 wt % of a silane coupling agent, 0.2 to 3 wt % of a vanadium-based anti-corrosive rust inhibitor, 3 to 12 wt % of colloidal silica, 0.5 to 5 wt % of a polysiloxane copolymer; and 14 to 61.3 wt % of water. The technical meaning of content ranges of respective components comprised in the surface treatment solution composition is as described above.

According to an exemplary embodiment in the present disclosure, the surface treatment solution composition may be applied to the hot dip galvanized steel sheet at a thickness of 2.14 to 3.57 μm. A thickness of the coating layer after drying the surface treatment solution composition applied at such a thickness through a drying process may be 0.3 to 0.5 μm, and preferably, 0.3 to 0.4 μm. When the thickness of the surface treatment solution composition applied to the hot dip galvanized steel sheet is less than 2.14 μm, the surface treatment solution composition is thinly applied to a mountain portion of a roughness of the hot dip galvanized steel sheet, such that corrosion resistance may be deteriorated, and when the thickness of the surface treatment solution composition applied to the hot dip galvanized steel sheet exceeds 3.57 μm, a thick coating layer is formed, such that weldability, processability and the like may be deteriorated.

A method for coating the surface treatment solution composition is not particularly limited as long as it is a commonly performed coating method, and may be preferably any one coating method selected from, for example, roll coating, spraying, immersion, spray squeezing, and immersion squeezing.

A process of drying the surface treatment solution composition coated on the hot dip galvanized steel sheet is preferably performed at a temperature of 40 to 60° C. based on a peak metal temperature (PMT) of a steel sheet. When the drying temperature is less than 40° C. based on the peak metal temperature (PMT) of the steel sheet, drying may not be performed completely, such that alkali resistance and pipe-forming oil invasion may become inferior, and when the drying temperature exceeds 60° C., the steel sheet is not sufficiently cooled and is packaged during a cooling process in the air (air cooling), and a dew condensation phenomenon thus occurs, such that blackening resistance of the steel sheet may become inferior.

Meanwhile, the drying is preferably performed in a hot air drying furnace or an induction heating furnace. When the surface treatment coating composition is dried using the hot air drying furnace, an internal temperature of the hot air drying furnace is preferably 100 to 200° C. Alternatively, when the surface treatment coating composition is dried using the induction heating furnace, a current applied to the induction heating furnace is preferably 1000 to 3500 A, and more preferably, 1500 to 3000 A. When the internal temperature of the hot air drying furnace is less than 100° C. or the current applied to the induction heating furnace is less than 1000 A, the surface treatment coating composition is not completely dried, such that alkali resistance and pipe-forming oil invasion may become inferior. In addition, when the internal temperature of the hot air drying furnace exceeds 200° C. or the current applied to the induction heating furnace exceeds 3500 A, the hot dip galvanized steel sheet is packaged without being sufficiently cooled during a cooling process in the air (air cooling), and a dew condensation phenomenon thus occurs, such that blackening resistance of the hot dip galvanized steel sheet may become inferior.

In addition, after drying the surface treatment solution composition to form the trivalent chromate coating layer, the trivalent chromate coating layer may be air-cooled to finally provide a surface-treated hot dip galvanized steel sheet.

The method for manufacturing a hot dip galvanized steel sheet according to an exemplary embodiment in the present disclosure may include a continuous process, and a speed of the continuous process is preferably 80 to 100 mpm. When the speed of the continuous process is less than 80 mpm, productivity may decrease, and when the speed of the continuous process exceeds 100 mpm, a solution may be scattered in a process of drying the surface treatment solution composition, resulting in a surface defect.

Hereinafter, the present disclosure will be described in more detail through specific examples. The following examples are only examples for assisting in the understanding of the present disclosure, and the scope of the present disclosure is not limited to these examples.

Inventive Example

1. Change in Physical Property According to Content of Trivalent Chromium Compound In order to experiment a change in physical properties according to contents of respective component of a surface treatment solution composition according to the present disclosure, a surface treatment solution composition comprising: chromium nitrate and chromium phosphate as a trivalent chromium compound; vanadium acetylacetonate as a vanadium-based anti-corrosive rust inhibitor; Ludox HAS (snowtex-O) as colloidal silica; a mixture of tetraethylorthosilicate and 3-glycyloxypropyl trimethoxysilane in 1:1 by weight as a silane coupling agent; a polysiloxane copolymer synthesized using polyvinylsiloxane, vinyltrimethoxysilane, and phosphoric acid as an acid catalyst and having a weight average molecular weight of 650 as a polysiloxane copolymer; and water was prepared.

Meanwhile, in the following Inventive Examples, a case where the surface treatment solution composition according to the present disclosure satisfies content ranges of Table 1 below was described as Inventive Example, and a case where one or more components do not satisfy content ranges of Table 1 was described as Comparative Example.

TABLE 1

| Division | Solution Component (wt %) Minimum | Solution Component (wt %) Maximum | Raw Material Solid Content (wt %) | Amount (wt %) of Component After Drying Minimum | Amount (wt %) of Component After Drying Maximum | Content (wt %) of Component in Dried Coating of Present Disclosure Minimum | Content (wt %) of Component in Dried Coating of Present Disclosure Maximum |
|---|---|---|---|---|---|---|---|
| Trivalent Chromium Compound | 30 | 51 | 27.53 | 57.9213 | 38.163 | 58.1 | 37.7 |
| Silane Coupling Agent | 5 | 15 | 99 | 34.7149 | 40.3639 | 34.6 | 40.7 |
| Vanadium-based Anti-corrosive Rust Inhibitor | 0.2 | 3 | 100 | 1.4026 | 8.1543 | 1.4 | 8.2 |
| Colloidal Silica | 3 | 12 | 20 | 4.2079 | 6.5235 | 4.2 | 6.6 |
| Polysiloxane Copolymer | 0.5 | 5 | 50 | 1.7533 | 6.7953 | 1.7 | 6.8 |
| Water | 61.3 | 14 | 0 | 0.0 | 0.3 | 0.0 | 0.0 |
| Total | 100 | 100 | — | 100 | 100 | 100.0 | 100.0 |

The following experiment was performed with surface treatment solution compositions having contents of respective components according to Tables 2 to 8, and contents of the respective components described in Tables 2 to 8 were described as "based on solid contents". In more detail, the phrase "based on solid contents" is based on 100% of a solid content, which appears because water comprised in a trivalent chromium compound and a silane coupling agent is removed in a dried coating state as well as water, which is a solvent comprised in a solution composition of the present disclosure, is removed in a dried coating state. Tables 2 to 8 show contents (wt %) measured in a case where solid contents are converted into 100 wt %, based on a case where the solid contents are 14 wt % in compositions prepared in each of Inventive Examples and Comparative Examples.

TABLE 2

| Division | Composition (wt %) of Composition | | | | | Processed | | |
| --- | --- | --- | --- | --- | --- | --- | --- | --- |
| | Trivalent Chromium Compound | Silane Coupling Agent | Vanadium-based Anti-corrosive Rust Inhibitor | Colloidal Silica | Polysiloxane Copolymer | Flat Plate Corrosion Resistance | Portion Corrosion Resistance | Blackening Resistance |
| Comparative Example 1 | 37.0 | 40.7 | 8.2 | 6.6 | 7.5 | X | X | X |
| Inventive Example 1 | 37.7 | 40.7 | 8.2 | 6.6 | 6.8 | ○ | ⊚ | ○ |
| Inventive Example 2 | 44.0 | 39.0 | 6.5 | 5.5 | 5.0 | ⊚ | ⊚ | ⊚ |
| Inventive Example 3 | 51.0 | 37.0 | 4.0 | 5.0 | 3.0 | ⊚ | ⊚ | ⊚ |
| Inventive Example 4 | 58.1 | 34.6 | 1.4 | 4.2 | 1.7 | ○ | ⊚ | ○ |
| Comparative Example 2 | 59.0 | 34.6 | 1.4 | 4.2 | 0.8 | X | X | ○ |

In order to measure a change in physical properties according to contents of respective components, specimens were manufactured by cutting a hot dip galvanized steel sheet into 7 cm×15 cm (width×length), removing oil, making a thickness of a dried coating layer 0.4 μm, bar-coating a trivalent chromium surface treatment solution composition prepared in Table 2, and then drying the trivalent chromium surface treatment solution composition under a condition of PMT of 60° C. Flat plate corrosion resistance, processed portion corrosion resistance, and blackening resistance of the manufactured specimens were evaluated, and evaluation results were shown in Table 2. Evaluation methods of the flat plate corrosion resistance, the processed portion corrosion resistance, and the blackening resistance are as follows.

<Flat Plate Corrosion Resistance>

According to a method defined in ASTM B117, the incidence of white rust in the hot dip galvanized steel sheet over time was measured after the specimens were treated. In this case, evaluation criteria are as follows.

⊚: White rust generation time is 144 hours or more
○: White rust generation time is 96 hours or more and less than 144 hours
Δ: White rust generation time is less than 55 hours and less than 96 hours
X: White rust generation time is less than 55 hours <Processed Portion Corrosion Resistance>

The specimen was pushed up to a height of 6 mm using an Erichsen tester, and a degree of white rust generation after 24 hours have elapsed was measured. In this case, evaluation criteria are as follows.

⊚: White rust generation after 48 hours has elapsed is less then 5%
Δ: White rust generation after 48 hours has elapsed is 5% or more and less than 7%
X: White rust generation after 48 hours has elapsed is 7% or more <Blackening Resistance>

The specimen was left for 120 hours in a thermo-hygrostat maintained at 50° C. and a relative humidity of 95%, and a color change (color difference: ΔE) of the specimen before/after a test was observed. In this case, evaluation criteria are as follows.

⊚: ΔE≤2
○: 2<ΔE≤3
Δ: 3<ΔE≤4
X: ΔE>4

As shown in Table 2, in a case where a content of the trivalent chromium compound satisfies a content proposed by the present disclosure (Inventive Examples 1 to 4), good or higher results were shown in all physical properties.

On the other hand, in a case where an excessively small amount of trivalent chromium compound was added (Comparative Example 1), poor results were shown in flat plate corrosion resistance, processing portion corrosion resistance, and blackening resistance, and in a case where an excessively large amount of trivalent chromium compound was added (Comparative Example 2), poor results were shown in all physical properties except for blackening resistance.

2. Change in Physical Properties According to Ratio of Chromium(III) Phosphate and Chromium(III) Nitrate Comprised in Trivalent Chromium Compound A trivalent chromium surface treatment solution composition according to Inventive Example 3 was used, but a ratio of chromium(III) phosphate and chromium(III) nitrate was controlled to be a ratio of chromium phosphate and chromium nitrate shown in Table 3. Specifically, chromium phosphate and chromium nitrate were added to distilled water, reacted at 80° C. for 1 hour, and then cooled to room temperature to prepare a trivalent chromium compound (chromium(III) phosphate and chromium(III) nitrate). In this case, contents of respective components were controlled so that the ratio of the chromium phosphate and the chromium nitrate satisfies ratios of Table 3.

TABLE 3

| Division | Trivalent Chromium Compound (wt %) | Content Ratio of Chromium Phosphate and Chromium Nitrate | | Flat Plate Corrosion Resistance | Blackening Resistance |
| --- | --- | --- | --- | --- | --- |
| | | Chromium Phosphate | Chromium Nitrate | | |
| Comparative Example 3 | 51.0 | 7 | 0 | ○ | X |
| Comparative Example 4 | 51.0 | 0 | 0.35 | X | ○ |
| Comparative Example 5 | 51.0 | 1 | 0.3 | X | ○ |
| Inventive Example 5 | 51.0 | 2 | 0.25 | ○ | ⊚ |
| Inventive Example 6 | 51.0 | 3 | 0.2 | ⊚ | ⊚ |
| Inventive Example 7 | 51.0 | 4 | 0.2 | ⊚ | ○ |
| Comparative Example 6 | 51.0 | 5 | 0.1 | ○ | X |

Specimens were manufactured by cutting a hot dip galvanized steel sheet into 7 cm×15 cm (width×length), removing oil, making a thickness of a dried coating layer 0.4 µm, bar-coating a trivalent chromium surface treatment solution composition prepared in Table 3, and then drying the trivalent chromium surface treatment solution composition under a condition of PMT of 60° C. Flat plate corrosion resistance and blackening resistance of the manufactured specimens were evaluated, and evaluation results were shown in Table 3. As shown in Table 3, as a ratio of the chromium phosphate increases, corrosion resistance is improved, whereas as a ratio of the chromium nitrate increases, blackening resistance tends to be improved. However, when the ratio of the chromium phosphate and the chromium nitrate is less than or equal to or is more than or equal to a ratio of chromium phosphate and chromium nitrate shown in the present disclosure, corrosion resistance or blackening resistance tends to become poor.

3. Change in Physical Properties According to Content and Type of Silane Coupling Agent A surface treatment solution composition containing trivalent chromium according to the present disclosure comprises: chromium nitrate and chromium phosphate as a trivalent chromium compound; vanadium acetylacetonate as a vanadium-based anti-corrosive rust inhibitor; Ludox HAS (snowtex-O) as colloidal silica; a mixture of tetraethylorthosilicate and 3-glycyloxypropyl trimethoxysilane in 1:1 by weight as a silane coupling agent; and a polysiloxane copolymer synthesized using polyvinylsiloxane, vinyltrimethoxy silane, and phosphoric acid as an acid catalyst and having a weight average molecular weight of 650 as a polysiloxane copolymer, and compositions of the surface treatment solution composition were mixed with each other in contents shown in Table 4 based on a solid content of the surface treatment solution composition.

tance, and blackening resistance are as described above, evaluation methods of the alkali resistance and the weldability are as follows.

<Alkali Resistance>

The specimen was immersed in an alkaline degreasing solution at 60° C. for 2 minutes, washed with water, and air-blown, and a color difference (ΔE) after/before a test was measured. Finecleaner L 4460 A: 20 g/2.4 L+L 4460 B 12 g/2.4 L (pH=12) of Dae Han Parkerizing Co., Ltd. was used as the alkaline degreasing solution. In this case, evaluation criteria are as follows.

⊚: ΔE≤2
○: 2<ΔE≤3
Δ: 3<ΔE≤4
X: ΔE>4

<Weldability>

The weldability was evaluated as maintaining a constant strength without a spatter at a pressing force of 250 kg, in a welding time of 15 cycles, and at a current of 7.5 kA using a pneumatic alternating current (AC) spot welding machine. In this case, evaluation criteria were presented in three modes: welding is possible (○) welding is impossible (X), and welding quality poor (Δ).

As shown in Table 4, in a case where a content of the silane coupling agent satisfies a content proposed by the present disclosure (Inventive Examples 8 to 11), good (○) or higher results were shown in all physical properties.

On the other hand, in a case where an excessively small amount of silane coupling agent was added (Comparative Example 7), a poor result was shown in poor alkali resistance, and in a case of an excessively large amount of silane coupling agent was added (Comparative Example 8), dryness of a coating was increased, and a hard coating was thus formed, such that poor results were shown in processed portion corrosion resistance, blackening resistance, and welding quality.

TABLE 4

| Division | Composition (wt %) of Composition | | | | | Alkali Resistance | Weldability | Flat Plate Corrosion Resistance | Processed Portion Corrosion Resistance | Blackening Resistance |
|---|---|---|---|---|---|---|---|---|---|---|
| | Silane Coupling Agent | Trivalent Chromium Compound | Vanadium-based Anti-corrosive Rust Inhibitor | Colloidal Silica | Polysiloxane Copolymer | | | | | |
| Comparative Example 7 | 34 | 45.4 | 8.0 | 6.6 | 6.0 | X | ○ | ○ | ⊚ | ○ |
| Inventive Example 8 | 34.6 | 45.4 | 8.0 | 6.0 | 6.0 | ○ | ○ | ⊚ | ⊚ | ○ |
| Inventive Example 9 | 36.6 | 45.4 | 7.0 | 6.0 | 5.0 | ○ | ○ | ⊚ | ⊚ | ⊚ |
| Inventive Example 10 | 38.7 | 45.4 | 7.0 | 5.0 | 3.9 | ⊚ | ⊚ | ⊚ | ⊚ | ⊚ |
| Inventive Example 11 | 40.7 | 45.4 | 6.0 | 5.0 | 2.9 | ⊚ | ⊚ | ⊚ | ⊚ | ○ |
| Comparative Example 8 | 41 | 45.4 | 6.0 | 4.7 | 2.9 | ○ | Δ | ⊚ | X | X |

Specimens were manufactured by cutting a hot dip galvanized steel sheet into 7 cm×15 cm (width×length), removing oil, making a thickness of a dried coating layer 0.4 µm, bar-coating a trivalent chromium surface treatment solution composition prepared in Table 4, and then drying the trivalent chromium surface treatment solution composition under a condition of PMT of 60° C. Flat plate corrosion resistance, processed portion corrosion resistance, blackening resistance, alkali resistance, and weldability of the manufactured specimens were evaluated, and evaluation results were shown in Table 4. Evaluation methods of the flat plate corrosion resistance, the processed portion corrosion resis- A trivalent chromium surface treatment solution composition according to Inventive Example 11 was prepared, and silane coupling agents shown in Table 5 were used as types of the silane coupling agent. Specimens were manufactured by bar-coating the trivalent chromium surface treatment solution compositions using the silane coupling agents described in Table 5 as described above and drying the trivalent chromium surface treatment solution compositions under a condition of PMT of 60° C., flat plate corrosion resistance of the specimens was evaluated, and evaluation results were shown in Table 5.

TABLE 5

| Division | A Content | B Content | C Content | D Content | E Content | F Content | G Content | H Content | I Content | J Content | K Content | Flat Plate Corrosion Resistance |
|---|---|---|---|---|---|---|---|---|---|---|---|---|
| Inventive Example 12 | 36.6 | 0 | 0 | 0 | 0 | 0 | 0 | 0 | 0 | 0 | 0 | ○ |
| Inventive Example 13 | 0 | 36.6 | 0 | 0 | 0 | 0 | 0 | 0 | 0 | 0 | 0 | ⊚ |
| Inventive Example 14 | 0 | 0 | 36.6 | 0 | 0 | 0 | 0 | 0 | 0 | 0 | 0 | ○ |
| Inventive Example 15 | 0 | 0 | 0 | 36.6 | 0 | 0 | 0 | 0 | 0 | 0 | 0 | ⊚ |
| Inventive Example 16 | 0 | 0 | 0 | 0 | 36.6 | 0 | 0 | 0 | 0 | 0 | 0 | ○ |
| Inventive Example 17 | 0 | 0 | 0 | 0 | 0 | 36.6 | 0 | 0 | 0 | 0 | 0 | ⊚ |
| Inventive Example 18 | 0 | 0 | 0 | 0 | 0 | 0 | 36.6 | 0 | 0 | 0 | 0 | ○ |
| Inventive Example 19 | 0 | 0 | 0 | 0 | 0 | 0 | 0 | 36.6 | 0 | 0 | 0 | ○ |
| Inventive Example 20 | 0 | 0 | 0 | 0 | 0 | 0 | 0 | 0 | 36.6 | 0 | 0 | ○ |
| Inventive Example 21 | 0 | 0 | 0 | 0 | 0 | 0 | 0 | 0 | 0 | 36.6 | 0 | ⊚ |
| Inventive Example 22 | 0 | 0 | 0 | 0 | 0 | 0 | 0 | 0 | 0 | 0 | 36.6 | ○ |
| Inventive Example 23 | 18.3 | 18.3 | 0 | 0 | 0 | 0 | 0 | 0 | 0 | 0 | 0 | ○ |
| Inventive Example 24 | 18.3 | 0 | 0 | 18.3 | 0 | 0 | 0 | 0 | 0 | 0 | 0 | ○ |
| Inventive Example 25 | 0 | 18.3 | 0 | 0 | 0 | 18.3 | 0 | 0 | 0 | 0 | 0 | ⊚ |
| Inventive Example 26 | 0 | 0 | 0 | 18.3 | 0 | 18.3 | 0 | 0 | 0 | 0 | 0 | ○ |
| Inventive Example 27 | 0 | 0 | 0 | 0 | 18.3 | 0 | 18.3 | 0 | 0 | 0 | 0 | ○ |
| Inventive Example 28 | 0 | 0 | 0 | 0 | 0 | 18.3 | 0 | 0 | 0 | 18.3 | 0 | ⊚ |
| Inventive Example 29 | 0 | 0 | 18.3 | 0 | 0 | 18.3 | 0 | 0 | 0 | 0 | 0 | ○ |
| Inventive Example 30 | 0 | 0 | 0 | 0 | 0 | 0 | 18.3 | 0 | 0 | 18.3 | 0 | ○ |
| Inventive Example 31 | 18.3 | 0 | 0 | 0 | 0 | 0 | 0 | 0 | 0 | 18.3 | 0 | ○ |
| Inventive Example 32 | 0 | 0 | 0 | 0 | 0 | 0 | 0 | 0 | 0 | 18.3 | 18.3 | ○ |
| Inventive Example 33 | 0 | 0 | 0 | 18.3 | 0 | 0 | 0 | 0 | 18.3 | 0 | 0 | ○ |
| Inventive Example 34 | 0 | 0 | 0 | 0 | 18.3 | 0 | 0 | 18.3 | 0 | 0 | 0 | ○ |
| Inventive Example 35 | 0 | 0 | 0 | 0 | 0 | 0 | 0 | 18.3 | 0 | 0 | 18.3 | ○ |
| Inventive Example 36 | 0 | 18.3 | 18.3 | 0 | 0 | 0 | 0 | 0 | 0 | 0 | 0 | ⊚ |
| Inventive Example 37 | 0 | 0 | 18.3 | 0 | 0 | 0 | 0 | 0 | 0 | 0 | 18.3 | ○ |
| Inventive Example 38 | 0 | 0 | 0 | 0 | 0 | 0 | 18.3 | 0 | 18.3 | 0 | 0 | ○ |
| Inventive Example 39 | 0 | 0 | 0 | 0 | 18.3 | 0 | 0 | 0 | 18.3 | 0 | 0 | ○ |
| Inventive Example 40 | 0 | 18.3 | 0 | 18.3 | 0 | 0 | 0 | 0 | 0 | 0 | 0 | ○ |
| Inventive Example 41 | 0 | 18.3 | 0 | 0 | 0 | 0 | 0 | 0 | 0 | 0 | 18.3 | ⊚ |
| Inventive Example 42 | 18.3 | 0 | 18.3 | 0 | 0 | 0 | 0 | 0 | 0 | 0 | 0 | ○ |
| Inventive Example 43 | 0 | 0 | 0 | 0 | 0 | 0 | 0 | 0 | 18.3 | 18.3 | 0 | ○ |

TABLE 5-continued

| Division | A Content | B Content | C Content | D Content | E Content | F Content | G Content | H Content | I Content | J Content | K Content | Flat Plate Corrosion Resistance |
|---|---|---|---|---|---|---|---|---|---|---|---|---|
| Inventive Example 44 | 0 | 18.3 | 0 | 0 | 18.3 | 0 | 0 | 0 | 0 | 0 | 0 | ○ |
| Inventive Example 45 | 0 | 0 | 0 | 0 | 0 | 0 | 18.3 | 18.3 | 0 | 0 | 0 | ○ |

A: 2-(3,4 epoxycyclohexyl)-ethyltrimethoxysilane
B: 3-glycyloxypropyl trimethoxysilane
C: 3-glycyloxypropyl methyldiethoxysilane
D: 3-glycyloxypropyl triethoxysilane
E: N-2-(aminoethyl)-3-aminopropyl methyldimethoxysilane
F: N-2-(aminoethyl)-3-aminopropyl trimethoxysilane
G: N-2-(aminoethyl)-3-aminopropyl triethoxysilane
H: 3-aminopropyl trimethoxysilane
I: 3-aminopropyl triethoxysilane
J: 3-ureido propyltrimethoxy silane
K: tetraethylorthosilicate As shown in Table 5, in Inventive Examples 12 to 45, good or excellent results were shown in flat plate corrosion resistance. In particular, in a case of a test specimen treated with a trivalent chromium surface treatment solution composition prepared according to a composition of Inventive Example 41, a white rust area generated after 144 hours or more was 0%, which shows the best result.

4. Change in Physical Properties According to Content of Vanadium-based Anti-corrosive Rust Inhibitor A surface treatment solution composition containing trivalent chromium according to the present disclosure comprises: chromium nitrate and chromium phosphate as a trivalent chromium compound; vanadium acetylacetonate as a vanadium-based anti-corrosive rust inhibitor; Ludox HAS (snowtex-O) as colloidal silica; a mixture of tetraethylorthosilicate and 3-glycyloxypropyl trimethoxysilane in 1:1 by weight as a silane coupling agent; and a polysiloxane copolymer synthesized using polyvinylsiloxane, vinyltrimethoxy silane, and phosphoric acid as an acid catalyst and having a weight average molecular weight of 650 as a polysiloxane copolymer, and compositions of the surface treatment solution composition were mixed with each other in contents (based on a solid content of the surface treatment solution composition) shown in Table 6.

Specimens were manufactured by cutting a hot dip galvanized steel sheet into 7 cm×15 cm (width×length), removing oil, making a thickness of a dried coating layer 0.4 μm, bar-coating a trivalent chromium surface treatment solution composition prepared in Table 6, and then drying the trivalent chromium surface treatment solution composition under a condition of PMT of 60° C. Flat plate corrosion resistance, processed portion corrosion resistance, blackening resistance, and alkali resistance of the manufactured specimens were evaluated, and evaluation results were shown in Table 6. Evaluation methods of the flat plate corrosion resistance, the processed portion corrosion resistance, blackening resistance, and the alkali resistance are as described above. As shown in Table 6, in a case where a content of the vanadium-based anti-corrosive rust inhibitor satisfies a content proposed by the present disclosure (Inventive Examples 46 to 48), good or higher results were shown in all physical properties.

On the other hand, in a case where an excessively small amount of the vanadium-based anti-corrosive rust inhibitor was added (Comparative Example 9), poor results were shown in all physical properties except for blackening resistance and alkali resistance, and in a case where an excessively large amount of the vanadium-based anti-corrosive rust inhibitor was added (Comparative Examples 10 and 11), poor results were shown in all physical properties except for corrosion resistance.

TABLE 6

| Division | Composition (wt %) of Composition | | | | | Processed | | | |
|---|---|---|---|---|---|---|---|---|---|
| | Vanadium-based Anti-corrosive Rust Inhibitor | Trivalent Chromium Compound | Silane Coupling Agent | Colloidal Silica | Polysiloxane Copolymer | Flat Plate Corrosion Resistance | Portion Corrosion Resistance | Blackening Resistance | Alkali Resistance |
| Comparative Example 9 | 1 | 50 | 37 | 6 | 6 | X | X | ◎ | ◎ |
| Inventive Example 46 | 1.4 | 50 | 36.6 | 6 | 6 | ○ | ◎ | ◎ | ◎ |
| Inventive Example 47 | 4.7 | 49 | 36.6 | 5 | 4.7 | ○ | ◎ | ◎ | ◎ |
| Inventive Example 48 | 8.2 | 49 | 35 | 5 | 2.8 | ◎ | ◎ | ○ | ○ |
| Comparative Example 10 | 8.5 | 49 | 35 | 5 | 2.5 | ◎ | ◎ | ○ | X |
| Comparative Example 11 | 9 | 48 | 35 | 5 | 3 | ◎ | ◎ | X | X |

5. Change in Physical Properties According to Content of Colloidal Silica

A surface treatment solution composition containing trivalent chromium according to the present disclosure comprises: chromium nitrate and chromium phosphate as a trivalent chromium compound; vanadium acetylacetonate as a vanadium-based anti-corrosive rust inhibitor; Ludox HAS (snowtex-O) as colloidal silica; a mixture of tetraethylorthosilicate and 3-glycyloxypropyl trimethoxysilane in 1:1 by weight as a silane coupling agent; and a polysiloxane copolymer synthesized using polyvinylsiloxane, vinyltrimethoxy silane, and phosphoric acid as an acid catalyst and having a weight average molecular weight of 650 as a polysiloxane copolymer, and compositions of the surface treatment solution composition were mixed with each other in contents (based on a solid content of the surface treatment solution composition) shown in Table 7.

On the other hand, in a case where an excessively small amount of the vanadium-based anti-corrosive rust inhibitor was added (Comparative Example 12), a poor result was shown in blackening resistance, and in a case where an excessively large amount of the vanadium-based anti-corrosive rust inhibitor was added (Comparative Example 13), a poor result was shown in corrosion resistance.

6. Change in Physical Properties According to Content of Polysiloxane Copolymer

A surface treatment solution composition containing trivalent chromium according to the present disclosure comprises: chromium nitrate and chromium phosphate as a trivalent chromium compound; vanadium acetylacetonate as

TABLE 7

| Division | Composition (wt %) of Composition | | | | | Processed | | |
| --- | --- | --- | --- | --- | --- | --- | --- | --- |
| | Colloidal Silica | Trivalent Chromium Compound | Silane Coupling Agent | Vanadium-based Anti-corrosive Rust Inhibitor | Polysiloxane Copolymer | Flat Plate Corrosion Resistance | Portion Corrosion Resistance | Blackening Resistance |
| Comparative Example 12 | 4 | 48 | 36 | 7 | 5 | X | X | ◎ |
| Inventive Example 49 | 4.2 | 48 | 36 | 7 | 4.8 | ○ | ○ | ◎ |
| Inventive Example 50 | 5 | 48 | 36 | 6 | 5 | ○ | ○ | ○ |
| Inventive Example 51 | 5.8 | 48 | 36 | 6 | 4.2 | ○ | ◎ | ○ |
| Inventive Example 52 | 6.6 | 48 | 36 | 6 | 3.4 | ○ | ◎ | ○ |
| Comparative Example 13 | 7 | 48 | 35.5 | 6 | 3.5 | ○ | ◎ | X |

Specimens were manufactured by cutting a hot dip galvanized steel sheet into 7 cm×15 cm (width×length), removing oil, making a thickness of a dried coating layer 0.4 μm, bar-coating a trivalent chromium surface treatment solution composition prepared in Table 7, and then drying the trivalent chromium surface treatment solution composition under a condition of PMT of 60° C. Flat plate corrosion resistance, processed portion corrosion resistance, and blackening resistance of the manufactured specimens were evaluated, and evaluation results were shown in Table 7. As shown in Table 7, in a case where a content of the vanadium-based anti-corrosive rust inhibitor satisfies a content proposed by the present disclosure (Inventive Examples 49 to 52), good or higher results were shown in all physical properties.

a vanadium-based anti-corrosive rust inhibitor; Ludox HAS (snowtex-O) as colloidal silica; a mixture of tetraethylorthosilicate and 3-glycyloxypropyl trimethoxysilane in 1:1 by weight as a silane coupling agent; and a polysiloxane copolymer synthesized using polyvinylsiloxane, vinyltrimethoxy silane, and phosphoric acid as an acid catalyst and having a weight average molecular weight of 650 as a polysiloxane copolymer, and compositions of the surface treatment solution composition were mixed with each other in contents (based on a solid content of the surface treatment solution composition) shown in Table 8.

TABLE 8

| Division | Composition (wt %) of Composition | | | | | Processed | | | |
| --- | --- | --- | --- | --- | --- | --- | --- | --- | --- |
| | Polysiloxane Copolymer | Trivalent Chromium Compound | Silane Coupling Agent | Vanadium-based Anti-corrosive Rust Inhibitor | Colloidal Silica | Flat Plate Corrosion Resistance | Portion Corrosion Resistance | Blackening Resistance | Alkali Resistance |
| Comparative Example 14 | 1.0 | 50.0 | 36.0 | 7.0 | 6.0 | X | X | X | ○ |
| Inventive Example 53 | 1.7 | 50.0 | 36.0 | 7.0 | 5.3 | ○ | ○ | ○ | ○ |
| Inventive Example 54 | 3.3 | 50.0 | 36.0 | 6.0 | 4.7 | ○ | ○ | ◎ | ○ |
| Inventive Example 55 | 4.9 | 50.0 | 35.0 | 6.0 | 4.1 | ○ | ◎ | ◎ | ○ |

TABLE 8-continued

| Division | Composition (wt %) of Composition | | | | | Processed | | | |
| --- | --- | --- | --- | --- | --- | --- | --- | --- | --- |
| | Polysiloxane Copolymer | Trivalent Chromium Compound | Silane Coupling Agent | Vanadium-based Anti-corrosive Rust Inhibitor | Colloidal Silica | Flat Plate Corrosion Resistance | Processed Portion Corrosion Resistance | Blackening Resistance | Alkali Resistance |
| Inventive Example 56 | 6.8 | 49.0 | 35.0 | 6.0 | 3.2 | ○ | ◎ | ○ | ○ |
| Comparative Example 15 | 7.5 | 48.0 | 35.0 | 6.0 | 3.5 | ○ | ◎ | ○ | X |

Specimens were manufactured by cutting a hot dip galvanized steel sheet into 7 cm×15 cm (width×length), removing oil, making a thickness of a dried coating layer 0.4 μm, bar-coating a trivalent chromium surface treatment solution composition prepared in Table 8, and then drying the trivalent chromium surface treatment solution composition under a condition of PMT of 60° C. As shown in Table 8, in a case where a content of the polysiloxane copolymer satisfies a content proposed by the present disclosure (Inventive Examples 53 to 56), good or higher results were shown in all physical properties. On the other hand, in a case where an excessively small amount of the anti-corrosive Rust Inhibitor was added (Comparative Example 14), poor results were shown in flat plate corrosion resistance, processed portion corrosion resistance, and blackening resistance, and in a case where an excessively large amount of the polysiloxane copolymer was added (Comparative Example 15), a poor result was shown in alkali resistance.

7. Change in Physical Properties According to Thickness of Coating Layer and Drying Temperature Specimens were manufactured by cutting a hot dip galvanized steel sheet into 7 cm×15 cm (width×length), removing oil, bar-coating the composition (a component of the silane coupling agent is based on Inventive Example 41) of Inventive Example 2, and then drying the composition by a hot air drying furnace. A thickness of a coated coating layer and a PMT were controlled to be a thickness shown in Table 9.

Alkali resistance, weldability, flat plate corrosion resistance, processed portion corrosion resistance, and blackening resistance of the manufactured specimens were evaluated, and evaluation results were shown in Table 9.

As shown in above Table 8, in a case where a coating layer was formed at a thickness of 0.3 to 0.5 μm (Inventive Examples 57 to 59), good or higher results were shown in all physical properties. On the other hand, in a case where the coating layer was formed at an excessively small thickness (Comparative Example 16), normal (Δ) results were shown in all physical properties other than weldability, and a poor result was shown in processed portion corrosion resistance. Meanwhile, in a case where the coating layer was formed at an excessively large thickness (Comparative Example 17), good or higher results were shown in all physical properties except for weldability, but since there is no physical property that is improved as compared with Inventive Example 59, a thickness of the coating larger than or equal to that of Inventive Example 59 is not required in terms of economy, and there is a problem that a welding quality is poor. In addition, as shown in Table 9, in a case where the coating layer was formed at a drying temperature of a coating of 40 to 60° C. (Inventive Examples 57 to 59 and 61), good or higher results were shown in all physical properties.

On the other hand, in a case where the drying temperature was excessively low (Inventive Example 60), the coating was not sufficiently dried, such that a normal (Δ) result was shown in alkali resistance. Meanwhile, in a case where the drying temperature was excessively high (Inventive Example 62), the hot dip galvanized steel sheet was packaged without being sufficiently cooled during a cooling process in the air (air cooling), such that a normal (Δ) result was shown due to a dew condensation phenomenon.

While exemplary embodiments have been shown and described above, it will be apparent to those skilled in the art

TABLE 9

| Division | Thickness (μm) of Coating Layer | Drying Temperature (° C.) | Alkali Resistance | Weldability | Flat Plate Corrosion Resistance | Processed Portion Corrosion Resistance | Blackening Resistance |
| --- | --- | --- | --- | --- | --- | --- | --- |
| Comparative Example 16 | 0.1 | 50 | Δ | ◎ | Δ | X | Δ |
| Inventive Example 57 | 0.3 | 50 | ◎ | ◎ | ◎ | ◎ | ◎ |
| Inventive Example 58 | 0.4 | 50 | ◎ | ◎ | ◎ | ◎ | ◎ |
| Inventive Example 59 | 0.5 | 40 | ◎ | ◎ | ◎ | ◎ | ○ |
| Comparative Example 17 | 0.8 | 50 | ◎ | Δ | ◎ | ◎ | ○ |
| Inventive Example 60 | 0.4 | 30 | Δ | ◎ | ○ | ○ | ○ |
| Inventive Example 61 | 0.4 | 60 | ◎ | ◎ | ◎ | ◎ | ◎ |
| Inventive Example 62 | 0.4 | 70 | ◎ | ◎ | ◎ | ◎ | Δ |

The invention claimed is:

1. A surface treatment solution composition comprising: based on 100 wt % of a total solid content of the surface treatment solution composition,
   37.7 to 58.1 wt % of a trivalent chromium compound comprising chromium phosphate and chromium nitrate, wherein a weight ratio of the chromium phosphate in a total weight of the chromium phosphate and the chromium nitrate is 0.89 to 0.95;
   34.6 to 40.7 wt % of a silane coupling agent;
   1.4 to 8.2 wt % of a vanadium-based anti-corrosive rust inhibitor;
   4.2 to 6.6 wt % of colloidal silica; and
   1.7 to 6.8 wt % of a polysiloxane copolymer.

2. The surface treatment solution composition of claim 1, wherein the silane coupling agent is one or more selected from the group consisting of 2-(3,4 epoxycyclohexyl)-ethyltrimethoxysilane, 3-glycyloxypropyl trimethoxysilane, 3-glycyloxypropyl methyldiethoxysilane, 3-glycyloxypropyl triethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl triethoxysilane, 3-aminopropyl trimethoxysilane, 3-aminopropyl triethoxysilane, 3-ureido propyltrimethoxysilane, and tetraethylorthosilicate.

3. The surface treatment solution composition of claim 1, wherein the vanadium-based anti-corrosive rust inhibitor is one or more selected from the group consisting of vanadium pentoxide ($V_2O_5$), metavanadic acid ($HVO_3$), ammonium metavanadate, sodium metavanadate, vanadium oxytrichloride ($VOCl_3$), vanadium trioxide ($V_2O_3$), vanadium dioxide ($VO_2$), vanadium oxysulfate ($VOSO_4$), vanadium oxyoxalate [$VO(COO)_2$], vanadium oxyacetylacetonate [$VO(OC(CH_3)=CHCOCH_3))_2$], vanadium acetylacetonate [$V(OC(CH_3))=CHCOCH_3))_3$], vanadium trichloride ($VCl_3$), vanadium sulfate ($VSO_4 \cdot 8H_2O$), vanadium dichloride ($VCl_2$), and vanadium oxide (VO).

4. The surface treatment solution composition of claim 1, wherein the colloidal silica includes silica particles dispersed in an acidic aqueous solution having a pH of 3 to 5, and the silica particles have a particle size of 5 to 15 nm.

5. The surface treatment solution composition of claim 1, wherein the polysiloxane copolymer has a weight average molecular weight of 300 to 1500.

6. A method for manufacturing a surface-treated hot dip galvanized steel sheet, comprising:
   coating the surface treatment solution composition of claim 1 on a hot dip galvanized steel sheet on which a hot dip galvanized layer is formed; and
   drying the coated surface treatment solution composition to form a trivalent chromate coating layer.

7. The method of claim 6, wherein in the coating of the surface treatment solution composition, the surface treatment solution composition is coated at a thickness of 2.14 to 3.57 μm.

8. The method of claim 6, wherein the drying of the coated surface treatment solution composition is performed at a temperature of 40 to 60° C. according to a peak metal temperature (PMT) of the steel sheet.

9. The method of claim 6, wherein the drying of the coated surface treatment solution composition is performed in a hot air drying furnace or an induction heating furnace.

10. The method of claim 9, wherein an internal temperature of the hot air drying furnace is 100 to 200° C.

11. The method of claim 9, wherein a current applied to the induction heating furnace is 1000 to 3500 A.

12. The method of claim 6, further comprising air-cooling the trivalent chromate coating layer.

13. The method of claim 6, wherein the method for manufacturing a hot dip galvanized steel sheet includes a continuous process, and a speed of the continuous process is 80 to 100 mpm.

14. A surface-treated hot dip galvanized steel sheet comprising:
   a steel sheet;
   a hot dip galvanized layer formed on at least one surface of the steel sheet; and
   a trivalent chromate coating layer formed on the hot dip galvanized layer,
   wherein the trivalent chromate coating layer comprises:
   37.7 to 58.1 wt % of a trivalent chromium compound comprising chromium phosphate and chromium nitrate, wherein a weight ratio of the chromium phosphate in a total weight of the chromium phosphate and the chromium nitrate is 0.89 to 0.95;
   34.6 to 40.7 wt % of a silane coupling agent;
   1.4 to 8.2 wt % of a vanadium-based anti-corrosive rust inhibitor;
   4.2 to 6.6 wt % of colloidal silica; and
   1.7 to 6.8 wt % of a polysiloxane copolymer.

15. The surface-treated hot dip galvanized steel sheet of claim 14, wherein the trivalent chromate coating layer has a thickness of 0.3 to 0.5 μm.

* * * * *